United States Patent [19]
Hartman

[11] Patent Number: 5,879,437
[45] Date of Patent: Mar. 9, 1999

[54] COMPOSITION FOR SURFACE TREATMENT

[75] Inventor: Nicholas Peter Hartman, Banbury, United Kingdom

[73] Assignee: Alcan International Limited, Montreal, Canada

[21] Appl. No.: 849,605

[22] PCT Filed: Dec. 6, 1995

[86] PCT No.: PCT/GB95/02850

§ 371 Date: Jul. 22, 1997

§ 102(e) Date: Jul. 22, 1997

[87] PCT Pub. No.: WO96/17896

PCT Pub. Date: Jun. 13, 1996

[30] Foreign Application Priority Data

Dec. 7, 1994 [GB] United Kingdom .................. 9424711

[51] Int. Cl.$^6$ .......................... C09D 183/02; B32B 15/01
[52] U.S. Cl. .................... 106/14.44; 106/14.14; 106/14.41; 106/287.1; 106/287.6; 427/387; 427/388.4; 428/469; 428/472; 428/594
[58] Field of Search .............................. 106/14.14, 14.44, 106/287.1, 14.41, 287.16; 428/469, 472, 594; 427/387, 388.4

[56] References Cited

U.S. PATENT DOCUMENTS 5,139,888  8/1992  Selwood et al. .................. 428/594

FOREIGN PATENT DOCUMENTS

| | | |
|---|---|---|
| 0358338 | 3/1990 | European Pat. Off. . |
| 948745 | 8/1949 | France . |
| 1390270 | 4/1975 | United Kingdom . |
| 1468565 | 3/1977 | United Kingdom . |
| WO9215650 | 9/1992 | WIPO . |

OTHER PUBLICATIONS

English Language Abstract of Japanese Patent Application No. 6–240207 (Aug. 30, 1994).

English Language Abstract of Japanese Patent No. 3–079675 (Apr. 4, 1991).

English Language Abstract of Japanese Publication No. 62–79274, Apr. 11, 1987.

*Primary Examiner*—Anthony Green
*Attorney, Agent, or Firm*—Cooper & Dunham LLP

[57] ABSTRACT

A coating composition containing a tetraalkyl silicate or a monomeric or oligomeric hydrolysis product thereof, present in a proportion of 40–90% by weight on the non-volatile content of the composition, and a hydrous oxide sol selected from Type A sols and Type B sols, present in a concentration such that the said oxide constitutes 10–60% by weight of the non-volatile content of the coating composition; optionally together with a surface wetting agent, marker material, defoamer, stabilizer, corrosion inhibitor and/or a catalyst which assists in chain-extension and cross-linking of the hydrolysis products in the presence of moisture; in dispersion in a fluid aqueous medium which is water optionally containing also from 0.1–40% by volume of polar organic liquid at least partly miscible with water. A method of pretreating a metal workpiece by applying this coating composition to a surface of the workpiece and drying the coating. The product is a metal workpiece carrying a surface coating thus formed. Coated workpieces may be secured together by an adhesive to constitute a structure.

11 Claims, No Drawings

COMPOSITION FOR SURFACE TREATMENT

This invention relates to aqueous compositions for surface treatment. One purpose of the treatment is to increase the adhesion of subsequently applied coatings, such as paint, lacquer, varnish or adhesive. Although the invention is of application to solid surfaces generally, it is of major importance in relation to metals generally, and in particular to aluminium.

Polydiethoxysiloxanes are used as refractory binders for metal casting moulds, and as binders for zinc-rich primers. They are made by the controlled hydrolysis of tetraethyl silicate to a 40% hydrolysed product known as "Ethyl Silicate 40" or "Silicate 40". This is a mixture of tetraethyl silicate and various polydiethoxysiloxane oligomers. These are generally used in solution in organic solvent; but such solvent necessarily carries a fire hazard.

WO 92/15650 (Alcan) describes an aqueous composition for the treatment of surfaces such as metal particularly aluminium, comprising a tetraalkyl silicate or a monomeric or oligomeric hydrolysis product thereof, and an inorganic passenger powder below 100 nm diameter such as fumed silica, both in dispersion in a fluid aqueous medium. The composition can be applied as a pretreatment coating to improve the adhesion of subsequently applied paint, lacquer or adhesive. Non-aqueous intermediate products comprising the silicate component and passenger powder can be diluted with water to make the coating composition.

This invention arises from our discovery that the nature of the inorganic component may be critical, and that advantages may result from replacing it. In particular, storage stability may be improved.

In one aspect this invention provides a coating composition comprising a tetraalkyl silicate or a monomeric or oligomeric hydrolysis product thereof, present in a proportion of 40–90% by weight on the non-volatile content of the composition, and a hydrous oxide sol, present in a concentration such that the oxide constitutes 10–60% by weight of the non-volatile content of the coating composition, optionally together with a surface wetting agent, marker material, defoamer, stabiliser, corrosion inhibitor and/or a catalyst which assists in chain-extension and cross-linking of the hydrolysis products in the presence of moisture, in dispersion in a fluid aqueous medium.

This coating composition is suitable for the pretreatment of solid surfaces such as metals generally, including steel, titanium, copper, zinc and, particularly aluminium, which term is used herein to include the pure metal and its alloys. The composition improves the adhesion properties of the pretreated surface, by improving the adhesion thereto of a subsequently applied coating such as paint, varnish, lacquer; or of adhesive either in the presence or absence of a lubricant. The pretreatment may improve either the initial adhesion of the subsequently applied coating to the surface or the maintenance of such adhesive properties in service, or both the initial adhesion and maintenance of adhesive properties. For example, so far as subsequently applied adhesive is concerned, the benefits of the invention may be shown mainly not in the initial adhesive strength obtained, but in the maintenance of adhesive strength in hostile or corrosive environments.

Tetraalkyl silicates (or tetraalkoxy silanes) can be progressively hydrolysed to silica according to the following equation:

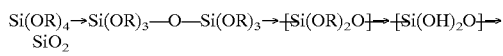

Preferably R in these formulae is ethyl. The unhydrolysed tetraalkylester can be used for this invention, and is preferred, but a partially hydrolysed product is a possible alternative. This component should generally be present in a proportion of 40–90%, preferably 50–80% by weight of the non-volatile content of the composition.

As hydrolysis proceeds, a starting solution of tetraalkyl silicate thickens and finally sets-up so as to be unusable. The oligomeric partial hydrolysis products that may be present in the compositions of this invention are of such size or such concentrations that the composition retains a usable application consistency.

The hydrous oxide sol is a stable, aqueous, colloidal dispersion containing primary particles or aggregates of primary particles which are smaller than 150 nm. Depending on the nature of the basic colloidal unit, sols can be classified into three types: type A, B and C.

Type A sols consist of basic units which are polynuclear ions which form an 'inorganic polymer' and are formed by hydrolysis and polymerisation of monomeric cations. The molecular weight of the polynuclear cations will depend on the degree of hydrolysis but these sols normally have an anion to metal ratio of approximately 1:1. The polymeric species are not large enough to scatter light efficiently, so the sol and the resultant gel are optically clear. The gel has a high density, low porosity and the X-ray diffraction pattern consists of very broad bands. J. D. F. Ramsay "Neutron and Light Scattering Studies of Aqueous Solutions of Polynuclear Ions, Water and Aqueous Solutions", 207–218 1986 (ed G. W. Neilson and J. E. Enderby: Bristol. Adam Hilger). Type A sols may be formed from the polynuclear ions listed in this paper including those containing Al(III) Fe(III) Zr(IV) Th(IV): for example:

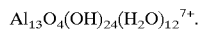

Type B sols consist of basic units with a definite shape, e.g. spherical, rod or plate-like, and are amorphous or microcrystalline. The sol is formed by extensive hydrolysis of a salt and has a low anion to metal atom ratio of approximately 0.3:1. The sols can also be prepared by peptization of fresh precipitates. The colloidal units are not aggregated and the sol and the resultant gel are both clear. Type B sols include colloidal silica and Al(III) Zr(IV) Ce(IV) Ti(IV) Fe(III). Preparation of Type B Al(III) sols is described in GB 1,174,648. Preparation of Ce Type B sol is described in GB 1,342,893. Type B Alumina Sols are available commercially.

In the type C sol the basic colloidal units are aggregated. They are crystalline and the gels formed by removal of water and have a low density. these sols scatter light and are therefore opaque. The sols formed from ultrafine powders prepared by vapour phase techniques, i.e. flame hydrolysed powders, belong to this category.

Type A and B sols when dehydrated yield gels which are >45% of the theoretical density of the oxide. The gels derived from type C sol are porous and have a density <45% of the theoretical density of the oxide.

The inorganic sol for use in this invention is a hydrous oxide sol, that is to say a Type A or Type B (but not Type C) sol. Examples are zirconia sols, ceria sols, titania sols, hafnia sols, alumina sols, iron oxyhydroxide sols, and particularly colloidal silica or silica sol.

The hydrous oxide sol improves the storage stability of the aqueous composition and assists in the formation of an insoluble matrix after drying. The hydrous oxide sol is preferably present in the coating composition in a concentration such that the oxide (metal oxide or preferably silica)

constitutes 10–60%, particularly 20–50%, by weight of the non-volatile content of the coating composition.

The aqueous medium preferably also contains a co-solvent, which helps to wet the surfaces to be coated and also to stabilise the aqueous dispersion. Suitable are polar organic liquids which are at least partly water soluble and preferably volatile, for example mono and polyhydric alcohols and ethers. When used, the co-solvent is preferably present in a proportion of 0.1–40%, particularly 1–20%, by volume on the volume of the whole aqueous medium.

A corrosion-inhibiting constituent may be included, for example a zirco-aluminate or a chromate or organo-metallic trivalent chromium compound, in proportions such as those typically used in metal coating compositions.

The composition may also include a catalyst which assists in the chain-extension and cross-linking of the hydrolysis product in the presence of moisture. The catalyst is used in a concentration to achieve hydrolysis of the tetraalkyl silicate in a convenient time. Suitable catalysts are mineral and organic acids such as nitric and acetic acids or bases such as amines. Free bases are not preferred as they produce formulations which are relatively unstable. Other suitable catalysts are latent catalysts such as salts or complexes of acids and bases which cease to be neutral on their decomposition. An example of a latent catalyst which becomes acidic on decomposition is ammonium acetate. Other suitable catalysts are those which are latent and generate bases on decomposition. An example of a blocked catalyst of this kind is an amine titanate chelate sold under the Trade name Tilcom AT 31 and believed to have the structure I; when the amine is chelated its basicity is reduced. This effect may be enhanced if the amine titanate is further neutralised with acetic acid.

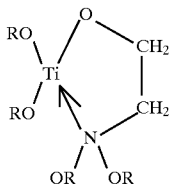

I

Acid peptised sols, such as a zirconium oxide sol peptised in nitric acid, may also be used.

Catalysts are in general not required in the composition of this invention and are preferably omitted. Though also not preferred, it is possible according to the invention to apply a coating composition not containing a catalyst to a surface, and then to apply the catalyst in a subsequent operation to hasten hydrolysis and chain extension of the polysiloxane.

The composition may also include hydrogen peroxide e.g. at a concentration up to 20 g/l. This may be particularly useful when an acid catalyst is used.

Water has a harmful effect on adhesive bonds. Thus components which are hygroscopic or humectant and which act to attract or retain moisture in the coating, are preferably not included in the coating composition.

Other components are usual in pretreatment coating compositions of this kind and may be included in conventional amounts in coating compositions according to this invention. Such components include surface wetting agents, marker materials, defoamers and stabilisers. Other conventional additives include silanes and organosiloxanes (which contain Si—C bonds and are distinguished on that account from tetraalkyl silicates).

One marker material, useful to indicate the presence or thickness of a surface coating, is polybutyl titanate. The addition of polybutyl titanate to aqueous solutions normally results in the rapid hydrolysis of the titanate with the formation of hydrated titanium dioxide, usually as a substantial precipitate, not suitable for roll-coat application.

However, the addition of 10% or even 20% w/w polybutyl titanate to the tetraalkyl silicate contained in a formulation is possible. A stable working solution, suitable for coil coating, is obtained. This may be achieved by adding the polybutyl titanate to the tetraalkyl silicate, in the desired amount, before proceeding with completion of the formulation.

A passenger powder of primary particle size below 100 nm may be included in the coating composition but is not preferred. Passenger powders often cause formulations to set-up or solidify and always gives rise to settling problems, and the primary particles aggregate and often form lumps. Passenger powders are not used as matrix builders or to control the structural topography of the coatings of this invention, and are preferably not used at all. However they may be used for secondary purposes such as markers, in concentration less than 20% or preferably 10% of the non-volatile content of the composition.

The coating composition preferably has a pH from 0 to 12, e.g. 1 to 4 and particularly from 1.3–3.0 in the presence of an acid catalyst and 5–12 e.g. 7–11 in the absence of such a catalyst. If the pH is too high, the emulsion is less stable and the composition has a poor shelf life. If the pH is too low, it may chemically attack the surface to which it is applied. Preferred silica sols are stabilised by alkali which may also enhance the stability to hydrolysis of the tetraalkyl silicate.

Tetraalkyl silicates and their partial hydrolysis products are not very stable in neat form, and are generally sold commercially in solution or dispersion in a polar volatile water-miscible organic solvent. In preparing coating compositions according to this invention, a convenient first step is to disperse the hydrous oxide e.g. silica sol in the silicate component, which may readily be done by means of a high shear stirrer. A co-solvent, if used, may suitably be added also at this stage.

The coating compositions of this invention may be supplied in a concentrated form to which a sufficient volume of a fluid aqueous medium is added to give a convenient application concentration. The aqueous medium may be water, optionally containing any desired catalyst and any hydrogen peroxide. Other components would generally be included in the supplied concentrated product. A co-solvent may also be used with this system. The aqueous coating compositions have a surprisingly good shelf life, of the order of many months. Improved solution stability leads to improved consistency; the coating compositions of this invention are easier to prepare on a commercial scale than the compositions of WO92/15650.

A metal workpiece to whose surface the aqueous composition is to be applied may be cleaned by conventional means appropriate to the substrate concerned. For aluminium this may be an acid or alkaline cleaning treatment, using commercially available chemicals such as those sold by ICI under the Trademark Ridolene 124/120E or Ridolene 336.

The composition may be applied to the surface by a convenient application technique such as roller coating, brushing or spraying. For aluminium strip, roller coating is likely to be an attractive option. The formulation may need to be adjusted to provide a convenient concentration for application by the desired method. After application, the coating on the surface is usually dried. Drying temperatures are from ambient up to 400° C., and may typically be in the range of 50°–200° C. With aluminium substrates, preferred drying temperatures are in the range 100°–150° C.

The surface of the workpiece preferably carries the coating at a thickness of 0.005–0.7 μm particularly from 0.01–0.5 μm. It is difficult to apply thicker films satisfactorily by a no-rinse type treatment. In practice it is more usual to measure coating weight, and this is preferably 20–500 mg, e.g. 50–200 mg, per square meter of coated surface. The invention envisages as an additional method step the application to the coated surface of an organic coating such as paint, lacquer, varnish or adhesive. There is increasing interest in the use of adhesively bonded aluminium workpieces as structures.

According to another aspect, the invention provides a metal workpiece provided with a surface coating as described and a lubricant, e.g. press lubricant, on the surface coating. Adhesives which are compatible with lubricants are commercially available. The invention also provides a structure of such metal workpieces secured together by adhesive. The technology is described, albeit with different surface coatings, in U.S. Pat. No. 5,139,888.

A metal workpiece is metal whose shape is not material to the invention, conveniently metal sheet or strip either before or after forming into shaped components to be adhesively bonded together to form a structure.

There follows a list of commercially available components suitable for use in the coating compositions of the invention.

Silester OS is the trade mark of a product marketed by Huels, which is a mixture of ethyl silicates containing approximately 20% silicon and approximately 1% ethyl alcohol.

Silester AR is the trade mark of a range of products marketed by Huels which are pre-hydrolysed ethyl silicate hybrid binders.

Syton X30 is a trade mark of Monsanto in respect of an aqueous dispersion of very small silica particles, typically 1.20 specific gravity and pH value 10.25 and containing nominally 30% by weight of silica. Sytons are slightly opalescent or milky white type B sols in which the specific surface area of the $SiO_2$ is 250 $m^2/g$, and the pH is 9.9.

Ludox is the trade mark of a range of silica sols marketed by DuPont and containing 30–50 wt % $SiO_2$ in the form of particles having a specific surface area of 140–360 $m^2/g$. These also are type B sols. (Ludox AM, pH 8.8; Ludox LS, pH 8.1).

Byk-346 is the trade mark of a solution of a polyether modified dimethyl polysiloxane containing 46% nonvolatile matter marketed by Byk-Chemie and useful as a surface wetting agent.

Aerosil 380 is the trade mark of Degussa in respect of a fumed silica used as an inorganic passenger powder.

EXAMPLE 1

Three typical formulations, A being a fumed silica formulation according to WO 92/15650, B being a colloidal silica formulation according to the present invention, and C being a silica-free formulation, are set out below (component parts are by weight).

| A. Fumed Silica Formulation | |
| --- | --- |
| Silester OS | 375.8 |
| Aerosil 380 | 179.7 |
| Propane-1,2-diol | 242.4 |
| Water | 1212.1 |
| TOTAL | 2000 |

| B. Colloidal Silica Formulation | |
| --- | --- |
| Silester OS | 315.5 |
| Syton X30 | 427.5 |
| Propane-1,2-diol | 203.6 |
| Byk 346 | 15.3 |
| Water | 1038.1 |
| TOTAL | 2000 |
| pH | 9.9 |
| C. Silica-free pretreatment formulation | |
| Silester XAR | 330 |
| Dipropylene glycol monomethyl ether | 700 |

Typical stability of the above solutions, in terms of freshly made up solutions kept under typical ambient indoor conditions (i.e. about 20° C.), are:

Fumed Silica formulation A: sets to firm gel in less than two days.

Colloidal Silica formulation B: remains useable for more than six months.

For stability reasons, formulation C could not be produced as a water-based treatment.

EXAMPLE 2

An experiment was performed to evaluate the three formulations of Example 1. Samples of the aluminium alloy were cleaned by a Ridolene 124/120E dip at 60° C. for one minute followed by a three minute dry at 100° C. Each of the formulations A, B and C was applied to a cleaned sample by roll coating, and the coated samples dried at 130° C. for three minutes. In some cases lubricant was applied to the thus-pretreated samples; in other cases lubricant was omitted. An adhesive was applied to the pretreated samples and used to join them together. Adhesive cure conditions were 145°/15 min followed by 190° C./15 min. Neutral salt spray results were obtained using single lap joints prepared from 2 mm gauge 5754-HO alloy, with a 20 mm×10 mm overlap. Bondline thickness was 0.2 mm. Three 4 mm holes were drilled across the centre of the joint after curing, as an accelerating factor, to allow more moisture to enter the joint. Joints were exposed to a constant high humidity at 43° C. with 5% sodium chloride spray for set periods of time. After 8 weeks and 20 weeks three replicate joints were removed. Residual strength of each joint was measured and compared with unexposed specimens (0 weeks exposure). The results are set out in the following Table 1.

TABLE 1

| | Neutral Salt Spray Results (Mpa) | | |
| --- | --- | --- | --- |
| Formulation | 0 Weeks | 8 Weeks | 20 Weeks |
| A + lubricant | 25.6 | 18.1 | 16.2 |
| B + lubricant | 25.1 | 19.2 | 12.8 |
| A no lubricant | 25.7 | 17.6 | 8.5 |
| B no lubricant | 25.5 | 18.8 | 13.2 |
| C + lubricant | 15.0 | 7.8 | 4.8 |
| C no lubricant | 15.8 | 10.9 | 3.0 |

The performance of formulation B is fully as satisfactory as that of formulation A and much better than that of formulation C.

In stress/humidity tests, a string of 6 joints is placed under load at a suitable level (in the example: 5 MPa which represents approximately 20% of failure load) by means of a compressed spring in a stressing tube. The joints are then placed in the stress/humidity cabinet and are subjected to condensing (100%) humidity with cycling temperature range of 42° to 48° C. whilst under constant load. The number of days to failure of the first joint is recorded. This is then removed and replaced by a solid aluminium test piece and the string re-loaded. This is repeated until three joints in the string have failed. A system having unsatisfactory performance would be expected to fail after less than or approximately 100 days. Results for four of the six systems are shown in Table 2 below. These four systems have survived more than 500 days without failure, indicating that the new formulations exhibit very good performance.

TABLE 2

| Formulation | Days on Test to Date | No of Failures |
|---|---|---|
| A + lubricant | 573 | none |
| B + lubricant | 573 | none |
| A no lubricant | 573 | none |
| B no lubricant | 573 | none |

The system "C+lubricant" and "C no lubricant" both failed after about 80 days,

EXAMPLES 3 TO 6

The formulations of four further coating compositions according to the invention are set out in the following Table 3.

TABLE 3

| | Example | | | |
|---|---|---|---|---|
| Component | 3 | 4 | 5 | 6 |
| Silester OS | 310 | 310 | 310 | 310 |
| Syton X30 | 470 | 470 | 420 | 470 |
| Propane-1-2-diol | | | 200 | 200 |
| Dipropylene glycol ether | | 200 | | |
| Tripropylene glycol ether | 220 | | | |
| Monopropylene glycol ether | | | 200 | |
| Water | 1050 | 550 | 800 | 550 |
| BYK-346 | | 15 | | 15 |
| Polybutyl titanate | | | 62 | |

The formulations described in Examples 3 to 6 are ready to use, and do not require dilution.

Examples 3, 4 and 5 illustrate that a range of propylene glycol ethers may be used in the formulation. Example 5 is a variant on the "standard" formulation with monopropylene glycol monomethyl ether. Example 4 uses dipropylene glycol monomethyl ether and example 3 uses tripropylene glycol monomethyl ether. All three formulations give good solution storage stability and satisfactory application to aluminium sheet by roll coating. Examples 4 and 5 may be dried at the standard drying conditions of 3 minutes at 130° C. As tripropylene glycol monomethyl ether has a higher boiling point (242.4° C.) example 3 does not give a dry pretreatment under these conditions. Example 5 is a polybutyl titanate modified formulation. It also has good stability and application properties.

Examples 3 and 4 were prepared only to evaluate their stability and application. Performance data for examples 5 and 6 are shown below in Table 4.

TABLE 4

| | Stress/humidity | Neutral salt spray results (Mpa) | | |
|---|---|---|---|---|
| Example | at 5 Mpa load | 0 weeks | 8 Weeks | 20 weeks |
| 5 | >650 days (no failures) | 23.9 | 19.5 | 16.5 |
| 6 | >650 days (no failures) | 24.6 | 19.1 | 12.8 |

EXAMPLES 7 TO 9

Formulation of "Non-Silica" Examples are Shown in Table 5

All components are by weight:

TABLE 5

| Example Component | 7 Zr Example | 8 Example | 9 Al Example |
|---|---|---|---|
| Silester OS (Hüls) | 310 | 310 | 310 |
| Bacote 20 | 310 | | |
| Polybutyl titanate | | 124 | |
| Aluminium C | | | 260 |
| Propane-1,2-diol | 200 | 200 | 200 |
| BYK 346 | 15 | 15 | 15 |
| Water | to 2000 milliliters in each case | | |
| pH (after 6 weeks storage at 20° C.) | 7.8 | 2.4 | 1.4 |
| Initial Strength (MPa) | 25.7 | 27.6 | 27.6 |

Bacote 20 is a zirconia sol from Magnesium Elektron, which has been modified by addition of 10% zirconium nitrate hydrate.

Polybutyl titanate is a titania sol from BTP Tioxide.

Aluminium C is an alumina sol from Degussa.

Initial bond strength was determined as in Example 2.

Both the titania and alumina pretreatments have an acid pH. All formulations were stable although there was some increased viscosity and settling. Shaking restored them to a homogenous dispersed state.

EXAMPLE 10

Commercial Trial

A full plant trial was carried out to assess the scale-up, application and performance of the pretreatment. 400 liters of pretreatment were prepared using U.S. sourced equivalents of formulation "B" of Example 1.

| Formulation: | |
|---|---|
| Dynasil 40 (Hüls - equivalent to Silester OS) | 420 |
| Ludox HS30 (Dupont equivalent to Syton X30) | 310 |
| Propane-1,2-diol | 200 |
| BYK 346 | 15 |
| Water | 1020 |
| Dynasil 40 is stated to have an average molecular weight of 610. | |

The trial was carried out on a full production line using 2 mm gauge aluminium coils (AA5754) with a width of 1700 mm.

On applying the pretreatment solution to pick up and applicator rolls, wetting occurred immediately (current product requires some conditioning of the rolls). Application to the sheet was very uniform and gave the correct pretreatment coat weights (50–100 mg/m²). Post-trial clean up was very simple. The line crew was very positive toward this pretreatment compared to the current product.

Performance data on material from this trial is shown in Table 6.

TABLE 6

| Example | Stress/humidity at 5 Mpa load | Neutral salt spray results (Mpa) | | |
|---|---|---|---|---|
| | | 0 weeks | 8 Weeks | 20 weeks |
| Pretreatment + Lubricant | >132 days (no failures) | 25.1 | 17.9 | 16.6 |
| Pretreatment without Lubricant | >132 days (no failures) | 25.5 | 20.0 | 18.3 |

I claim:

1. A coating composition having a non-volatile content and comprising a tetraalkyl silicate or a monomeric or oligomeric hydrolysis product thereof, present in a proportion of 40–90% by weight on the non-volatile content of the composition, and a hydrous oxide sol selected from Type A sols and Type B sols, present in a concentration such that the oxide of the hydrous oxide sol constitutes 10–60% by weight of the non-volatile content of the coating composition; optionally together with at least one of a surface wetting agent, a marker material, a defoamer, a stabilizer, a corrosion inhibitor and a catalyst which assists in chain-extension and cross-linking of the monomeric or oligomeric hydrolysis product; in dispersion in a fluid aqueous medium which is water optionally containing also from 0.1–40% by volume of polar organic liquid at least partly miscible with water.

2. A composition as claimed in claim 1, wherein the oligomeric hydrolysis product is a polysiloxane.

3. A composition as claimed in claim 1, wherein the tetraalkyl silicate or monomeric or oligomeric hydrolysis product thereof is tetraethyl silicate.

4. A composition as claimed in claim 1, wherein the hydrous oxide sol is a silica sol.

5. A method of pretreating a metal workpiece, which method comprises applying to a surface of the workpiece a coating composition according to claim 1, and drying the coating.

6. A metal workpiece having a surface coating formed by applying to the surface of the workpiece a coating composition and drying the coating; wherein the coating composition has a non-volatile content and comprises a tetraalkyl silicate or a monomeric or oligomeric hydrolysis product thereof, present in a proportion of 40–90% by weight on the non-volatile content of the composition, and a hydrous oxide sol selected from Type A sols and Type B sols, present in a concentration such that the oxide of the hydrous oxide sol constitutes 10–60% by weight of the non-volatile content of the coating composition; optionally together with at least one of a surface wetting agent, a marker material, a defoamer, a stabilizer, a corrosion inhibitor and a catalyst which assists in chain-extension and cross-linking of the monomeric or oligomeric hydrolysis product; in dispersion in a fluid aqueous medium which is water optionally containing also from 0.1–40% by volume of polar organic liquid at least partly miscible with water.

7. A metal workpiece as claimed in claim 6, wherein a lubricant is present on the surface coating.

8. A metal workpiece as claimed in claim 6, wherein there is present an organic film overlying the surface coating.

9. A metal workpiece as claimed in claim 8, wherein the organic film is a paint lacquer or varnish film.

10. A metal workpiece as claimed in claim 6, wherein there is present an adhesive overlying the surface coating.

11. A structure of metal workpieces secured together by adhesive; wherein each metal workpiece has a surface coating formed by applying to the surface of the workpiece a coating composition and drying the coating; wherein the coating composition has a non-volatile content and comprises a tetraalkyl silicate or a monomeric or oligomeric hydrolysis product thereof, present in a proportion of 40–90% by weight on the non-volatile content of the composition, and a hydrous oxide sol selected from Type A sols and Type B sols, present in a concentration such that the oxide of the hydrous oxide sol constitutes 10–60% by weight of the non-volatile content of the coating composition; optionally together with at least one of a surface wetting agent, a marker material, a defoamer, a stabilizer, a corrosion inhibitor and a catalyst which assists in chain-extension and cross-linking of the monomeric or oligomeric hydrolysis product; in dispersion in a fluid aqueous medium which is water optionally containing also from 0.1–40% by volume of polar organic liquid at least partly miscible with water.

* * * * *